United States Patent [19]

Bryson

[11] Patent Number: 4,476,972
[45] Date of Patent: Oct. 16, 1984

[54] METHOD AND APPARATUS FOR TURNING FILLED CARTONS WITH POSITIVE ASSIST

[75] Inventor: John W. Bryson, Los Altos, Calif.

[73] Assignee: Kliklok Corporation, Greenwich, Conn.

[21] Appl. No.: 300,601

[22] Filed: Sep. 9, 1981

[51] Int. Cl.³ .............................................. B65G 47/24
[52] U.S. Cl. ..................................... 198/415; 198/411
[58] Field of Search .............. 198/415, 411, 836, 598, 198/367, 372, 416, 394

[56] References Cited

U.S. PATENT DOCUMENTS

| | | | |
|---|---|---|---|
| 2,709,513 | 5/1955 | Weber et al. | 198/415 |
| 2,805,753 | 9/1957 | Palmer | 198/415 |
| 2,984,332 | 5/1961 | Pierce | 198/415 |
| 3,142,371 | 7/1964 | Rice et al. | 198/394 |
| 3,165,193 | 12/1965 | Stevenson, Jr. | 198/415 |
| 3,427,779 | 2/1969 | Goldman | 198/415 |
| 3,432,023 | 3/1969 | Lucas | 198/415 |
| 3,619,977 | 11/1971 | Theys et al. | 198/415 |
| 4,010,842 | 3/1977 | Smith | 198/394 |
| 4,020,941 | 5/1977 | Kennedy | 198/416 |

FOREIGN PATENT DOCUMENTS

| | | | |
|---|---|---|---|
| 926776 | 4/1955 | Fed. Rep. of Germany | 198/411 |
| 213719 | 3/1964 | Sweden | 198/411 |
| 1585324 | 2/1981 | United Kingdom | 198/836 |

Primary Examiner—Joseph E. Valenza
Assistant Examiner—Kyle E. Shane
Attorney, Agent, or Firm—King and Liles

[57] ABSTRACT

A method and apparatus for assisting in turning or reorienting cartons during transition between conveyors is disclosed wherein a moving finger engages one side of the carton adjacent the leading edge of the carton. The moving finger initiates the turning action and assists in the final turning action generated by a friction plate and pressure brush. The finger is mounted in a horizontal plane for rotation about a vertical axis and engages the side of the carton within leading 15%–35% along the length of the carton. The finger provides sufficient turning assist action to assure reorientation of a carton through at least 90°. The finger should be flexible in order to provide shock absorbing action.

16 Claims, 8 Drawing Figures

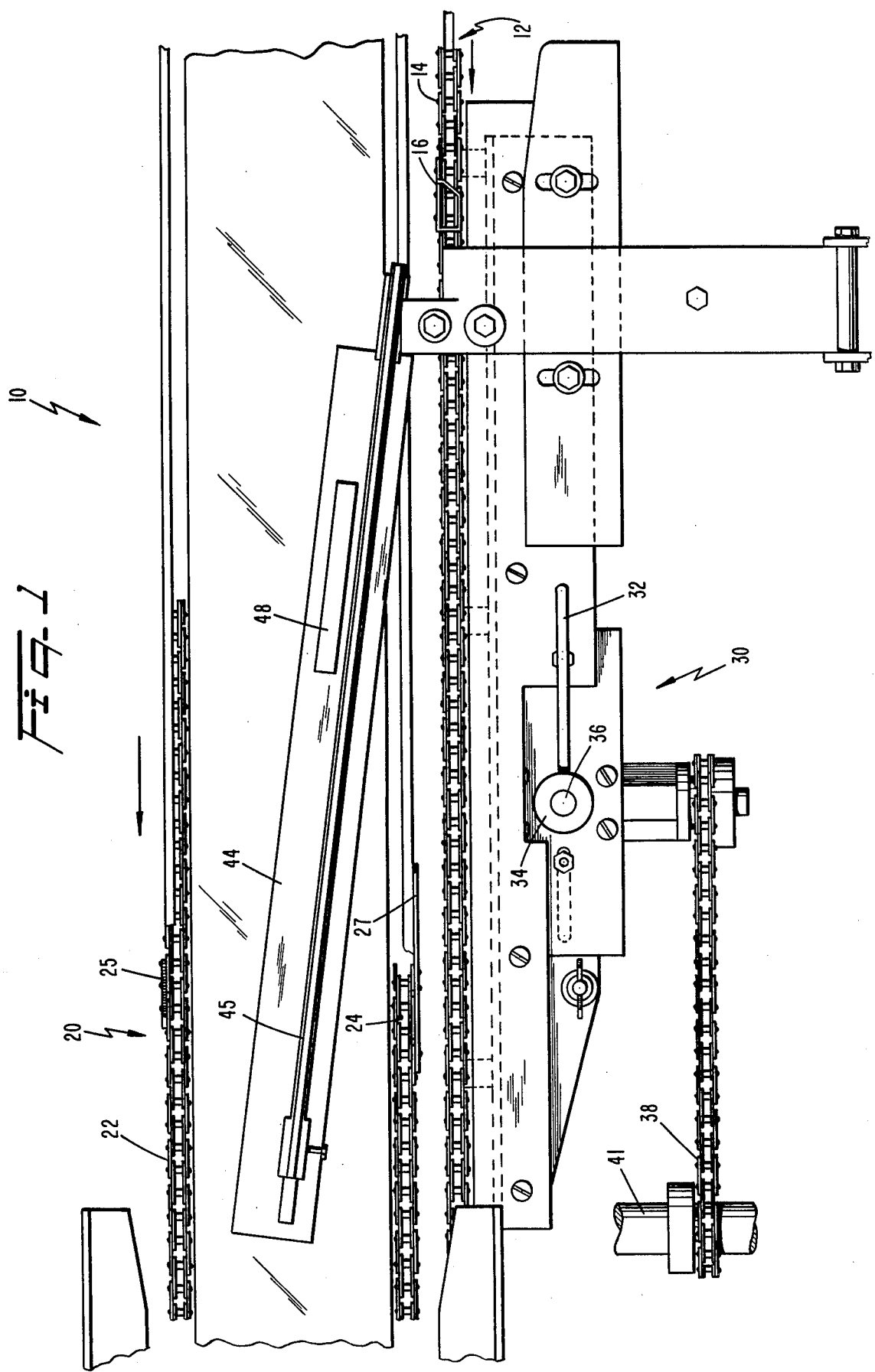

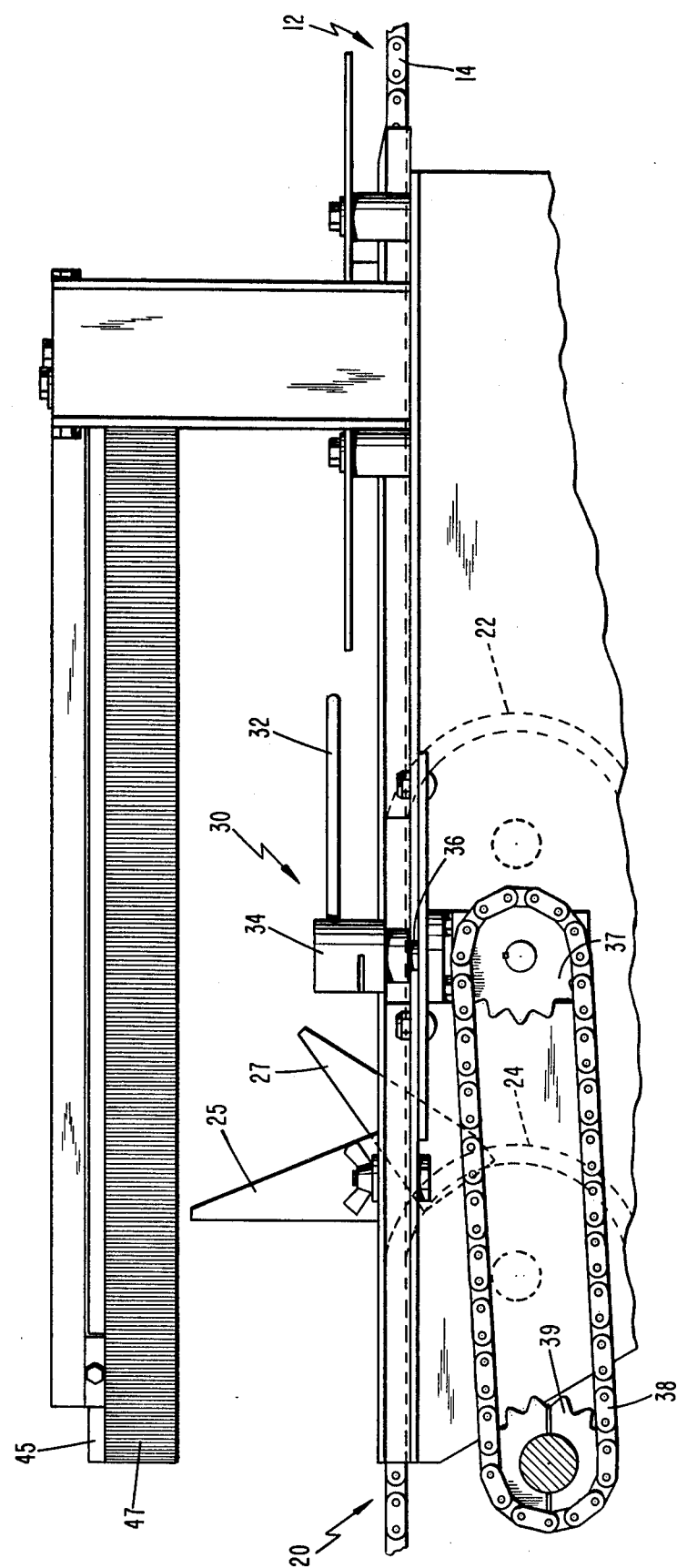

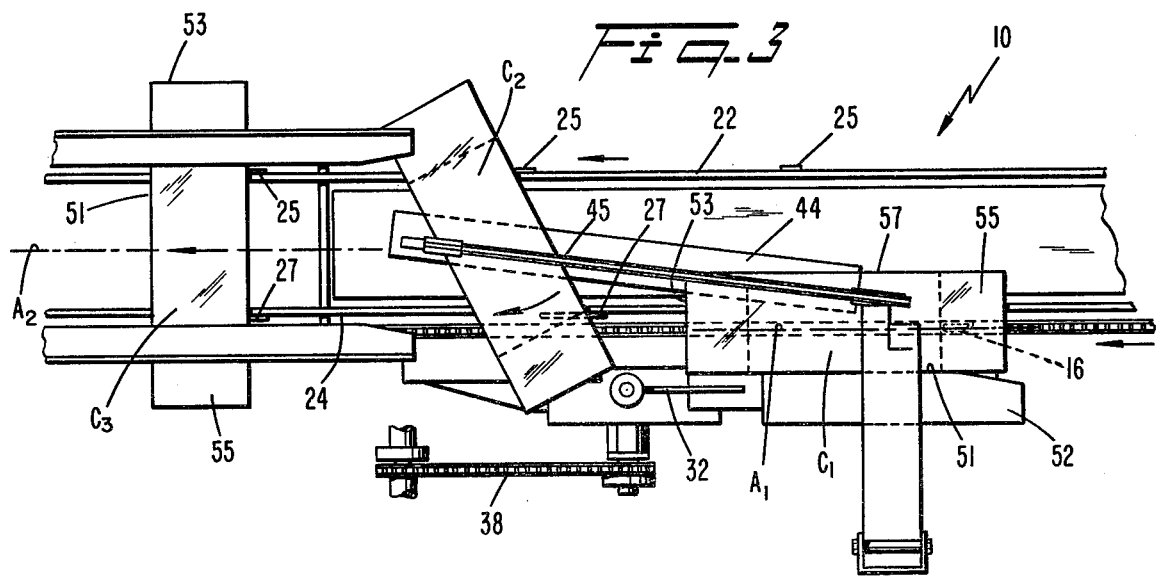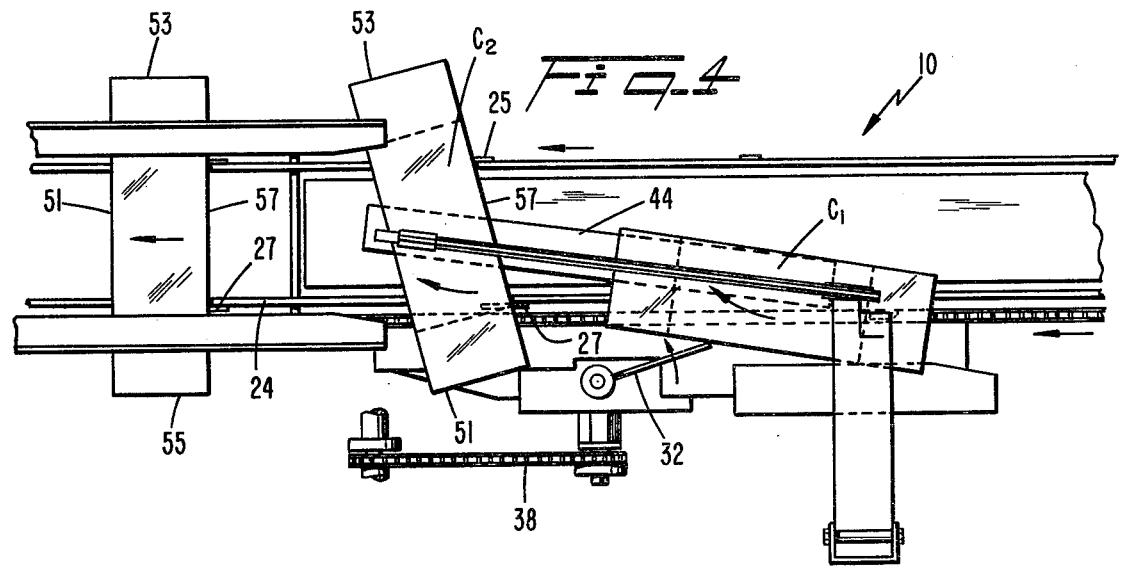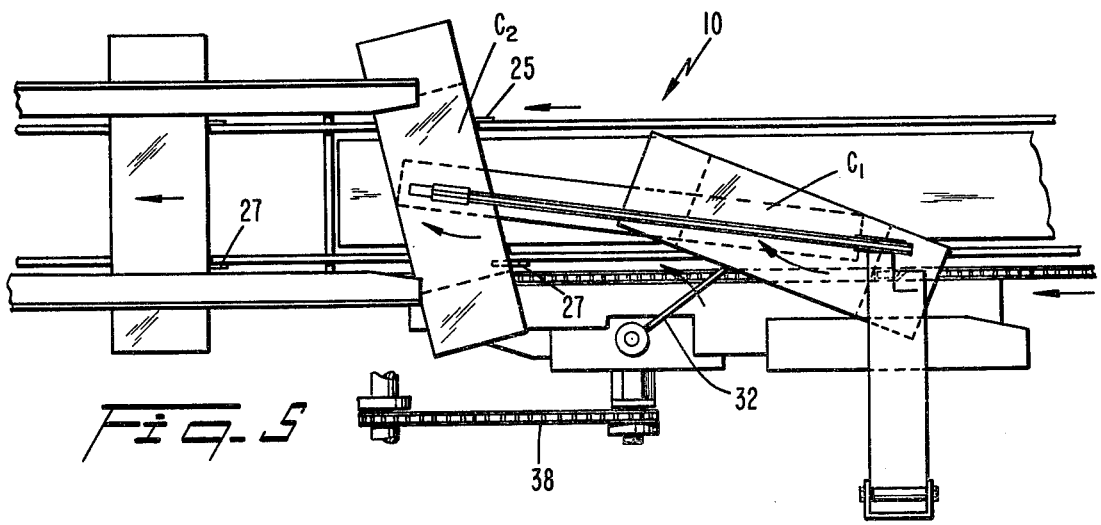

METHOD AND APPARATUS FOR TURNING FILLED CARTONS WITH POSITIVE ASSIST

TECHNICAL FIELD

This invention relates to a method and apparatus for turning a carton or the like by gently engaging a side thereof, and more particularly to the turning of the cartons with a positive assist through 90° during transition from a first conveyor to a second conveyor.

BACKGROUND ART

It is commonly known to form, fill, close and seal cartons or boxes as they are transported along conveyors, as described for example in U.S. Pat. No. 3,267,637, Baker, assigned to the assignee of the present application. These cartons are filled with food or other delicate items and normally move on a plurality of conveyors transporting the cartons past several operation stations, including side sealing stations. In the case of a Charlotte carton sealed along the sides, that is, along a front flap and then along the end flaps thereof, it is necessary to turn the carton 90° to effect the desired sealing operations.

Various attempts have been made at performing the turning of the cartons. In one approach, the conveyors are situated at right angles to one another. However, this is generally not desirable from the standpoint of space considerations. Also, various mechanisms have been employed to cause the turning of the carton moving along the conveyor system. Typically, the mechanisms for turning the cartons employ a hooking mechanism to hook the box and contents, thereby resulting in a deleterious jerking action. This is not satisfactory from the standpoint that the box and/or contents may be damaged. A hooking mechanism is described in U.S. Pat. No. 3,427,779 to Goldman.

Still, another approach at turning the boxes or cartons has been to use a stop and guide rail device in conjunction with the conveyor, as described for example in U.S. Pat. No. 3,619,977 to Theys et al. Again, this is not altogether satisfactory from the standpoint that the box and/or contents may be adversely affected.

Furthermore, when cartons are turned by friction, especially if the product is relatively heavy, unusually light or with uneven weight distribution, the turning action is sometimes erratic. This is also true where cartons being turned have a product inside susceptible to shifting during turning. Thus, a need is identified for assuring positive turning of the cartons, especially under these special conditions.

DISCLOSURE OF THE INVENTION

It is therefore the principal object of this invention to improve the handling of cartons or boxes, especially relatively long cartons, filled with food or the like.

It is another object of the present invention to provide method and apparatus for turning cartons filled with food and the like while being transported along a plurality of conveyors.

It is still another object of the present invention to improve the handling of cartons filled with relatively heavy product, little or no product, or product unevenly distributed, to permit controlled, positive turning or reorientation of the carton to different sides thereof without causing damage to the carton or contents thereof.

It is still a further object of the present invention to convey cartons filled with food or the like along multiple conveyors along which a sealing operation is effected on at least the front and one end in a simpler and more efficient manner than used heretofore.

Still a further object of the invention is to provide turning assistance to a carton by applying an independently movable sweep finger engaging the side of the carton.

The method and apparatus of the present invention utilizes the concept of conveying the carton along a feed path, turning the carton to provide reorientation of the carton and engaging the carton along at least one side with a moving finger having a transverse component to the path in order to positively assist the carton in making the turn. With this concept, a carton is gently turned and the erratic action of the prior art turning devices of the past is avoided. By providing a positive assist, in the form of an independent second action, cartons that are relatively heavy or unusually light or with uneven weight distribution, may be turned in a very reliable operation.

Preferably, the turning and turning assist operation of the present invention reorients the carton through approximately 90°. This particular apparatus/method may be utilized when handling filled cartons for sealing the front and side flaps of a Charlotte-type carton. Of course, other types of carton turning operations can utilize the concepts of the present invention with great advantage.

Preferably, the moving finger sweeps across the feed path for the cartons. As shown in the preferred embodiment, the finger is an elongated rod parallel to the feed path and mounted on a driven rotating hub. A drive shaft extending substantially vertically supports the hub adjacent the feed path. The hub is driven in timed relationship to the conveyor. The finger rod is preferably flexible to permit shock absorbing action. The main turning means is preferably a bottom friction plate and a cooperating pressure brush engaging the top of the carton adjacent the side opposite the side being engaged for turning assist.

In accordance with another aspect of the invention, the timing of the finger is such that engagement occurs along the side of the carton adjacent the leading edge of the carton. More specifically, the distal end of the assist finger engages the carton within 15%-35% along the length of the side. Preferably, the assist finger is also utilized to initiate the turning step.

The end of the finer remains relatively static with respect to the side once engagement occurs. When completion of the turn is assured, the finger continues around in a circle in readiness for engaging and turning the next in-line carton.

The turning or reorientation occurs during the conveying operation as the cartons are fed from a first conveyor, having a single moving lug, to a second conveyor having two spaced moving lugs. The single lug engages the initial trailing side of the carton and provides the initial forward movement for turning the carton by the friction action. The two lugs of the second conveyor engage the new trailing side, with the lug adjacent said one side lagging behind in order to complete the turning action.

The foregoing and other objects, features and advantages of the invention will become more readily apparent upon reference to the following detailed description of the best mode for carrying out the invention, when taken in conjunction with the accompanying drawings.

DESCRIPTION OF THE DRAWINGS

FIG. 1 is a plan view of the turning apparatus according to the present invention;

FIG. 2 is a side or elevation view of the turning apparatus; and

FIGS. 3-8 are plan views in sequence illustrating the sequential carton turning according to the principles of the present invention.

BEST MODE FOR CARRYING OUT THE INVENTION

Figure 6:
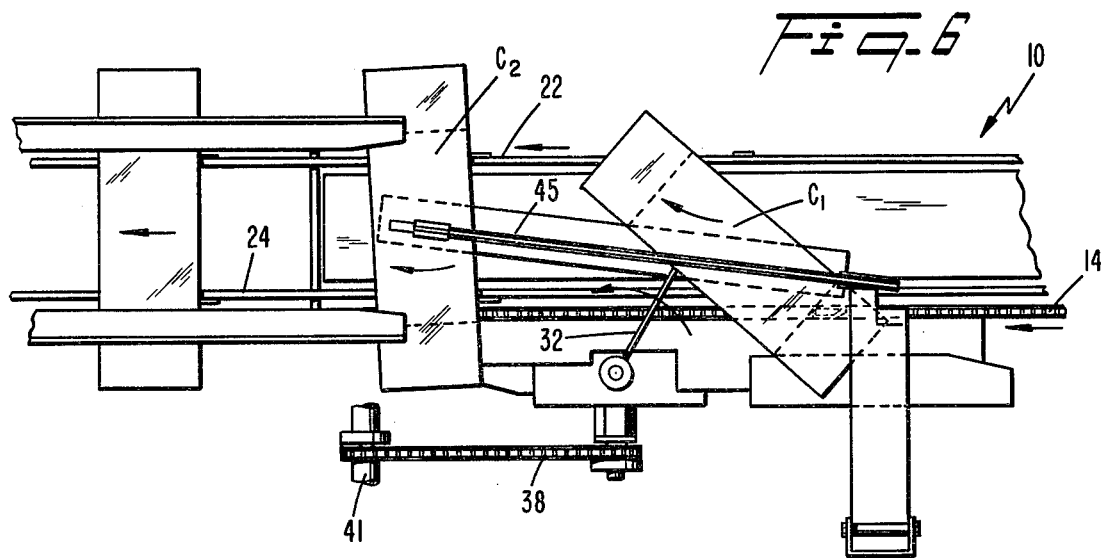

With reference now to FIGS. 1 and 2 of the drawings, a turning apparatus 10 is illustrated incorporating the features of the present invention. The turning apparatus 10 is preferably positioned at the juncture or transition between the two conveyors, such as feed conveyors on a carton closing machine. The cartons move serially along the machine so as to pass various operating stations. For example, the cartons move past a filling station, flap folding stations, adhesive activation stations and then sealing stations for the flaps of the carton. Each carton is usually sealed on one side, the front, and then the carton is turned through 90° for simultaneous sealing of the two additional sides, that is the ends. The flaps are sealed by being plowed down in position by plow rails (not shown) to complete the closing of the carton.

The first in-line conveyor comprises an endless chain with upstanding lugs 16 on the chain operative to engage and move the cartons along the predetermined feed path. The manner in which the cartons are fed by the first conveyor 12 is best illustrated by carton $C_1$ in FIG. 3. The pusher lug 16 of the conveyor 12 engages the trailing side of the carton $C_1$ under the trailing end flap. The carton $C_1$ has its longitudinal axis $A_1$ extending in the direction of the feed path (see FIG. 3).

A second in-line conveyor 20 is provided downstream of the first conveyor 12. A pair of chains 22, 24, running parallel to the chain 14 has pushing lugs 25, 27 picking up the next downstream carton $C_2$ (see FIG. 3). As best shown in FIG. 2, the lug 27 lags behind the lug 25. For this reason, the lug 27 serves to complete the turning action of the cartons, as will be seen in more detail below. The early engagement of the lug 25 is provided by the upstream positioning of the sprocket carrying the chain 22 (see FIG. 2). It should be understood that the two chains 22, 24 are driven in unison and are timed with the chain 14 so as to provide the proper feed and transition of the cartons along the feed path. The third carton positioned along the feed path in FIG. 3 is carton $C_3$. As shown, this carton has completed a full turn and the lugs 25, 27 are fully engaged behind the new trailing side.

When the turning apparatus 10 of the present invention is utilized in a carton closing environment, it is understood that the cartons arrive in the position of carton $C_1$ with the front flap plowed down and sealed into position. The carton turning through the position of cartons $C_2$ to the final position of carton $C_3$ is for the purpose of bringing the end flaps 53, 55 (FIG. 3) into proper position for sealing downstream (not shown). A new axis, $A_2$, is then aligned with the feed path of the cartons through the closing machine. The reorientation provides proper positioning of the flaps 53, 55 whereby the final closing of the cartons may be accomplished.

The main turning operation is provided in the preferred embodiment by a friction plate 44 positioned at the transition area, as best shown in FIG. 1. The bottom of the cartons engage the friction plate at a point just upstream of the position of carton $C_1$, as shown in FIG. 3. A generally coextensive brush 45 is provided above the feed path in order to engage the tops of the cartons. The flexible bristles of the brush, as noted by bristles 47 (FIG. 2), engage the carton on the top and thus urge the bottom of the carton against the plate. The bottom (and top) friction forces adjacent the side of the carton on the inside of the turn (as shown in FIG. 3, the far side) serves to skew the carton into the turn. The plate 44 may include strategically placed rubber strips 48 in order to provide increased friction in the area of initiation of the turn (see FIG. 1). Of course, other main turning mechanism can be used in accordance with the broadest aspects of the present invention.

The turning assist concept of the present invention, preferably takes the form of a turning assist mechanism 30 positioned along one side of the feed path for the cartons. The turning assist mechanism 30 comprises a sweep finger 32 extending generally horizontally and radially outwardly from a mounting hub 34. Vertical drive shaft 36 serves to rotate the hub 34 and thus bodily move the finger 32 so as to sweep across the feed path (see sequence FIGS. 3-8). Shaft 36 is driven synchronously with the conveyors 12, 20 through a chain 38 and a drive shaft 41.

Thus, in operation, and as best shown in the sequence FIGS. 3-8, the carton $C_1$ is transported to the turning station with front side 51 adjacent guide rail 52 (see FIG. 3). At this point, the front flap of the Charlotte-type carton has been folded down and sealed against the carton $C_1$. The rotating sweep finger 32 in the position shown in FIG. 3 is not engaged with the carton $C_1$. The far leading corner of the carton $C_1$ is in engagement with the friction plate 44 and the brush 45 is pressing the carton $C_1$ downwardly so that the carton's movement is just beginning to be retarded.

In FIG. 4, the finger 32 bodily moves from further rotation so that the distal end of the finger 32 engages the side of the carton $C_1$ and positively initiates the turn. The finger 32 does, in effect, independently engage the side of the carton $C_1$, initiates the turning movement and assist the carton $C_1$ in turning. The finger 32 sweeps across the feed path for the carton.

The movement of the finger 32 is horizontal and thus substantially parallel to the feed path. The timing is such that the finger engages the front side 51 of the carton $C_1$ adjacent the leading edge of the carton (see FIG. 4) for the most expeditious turning.

Figure 7:
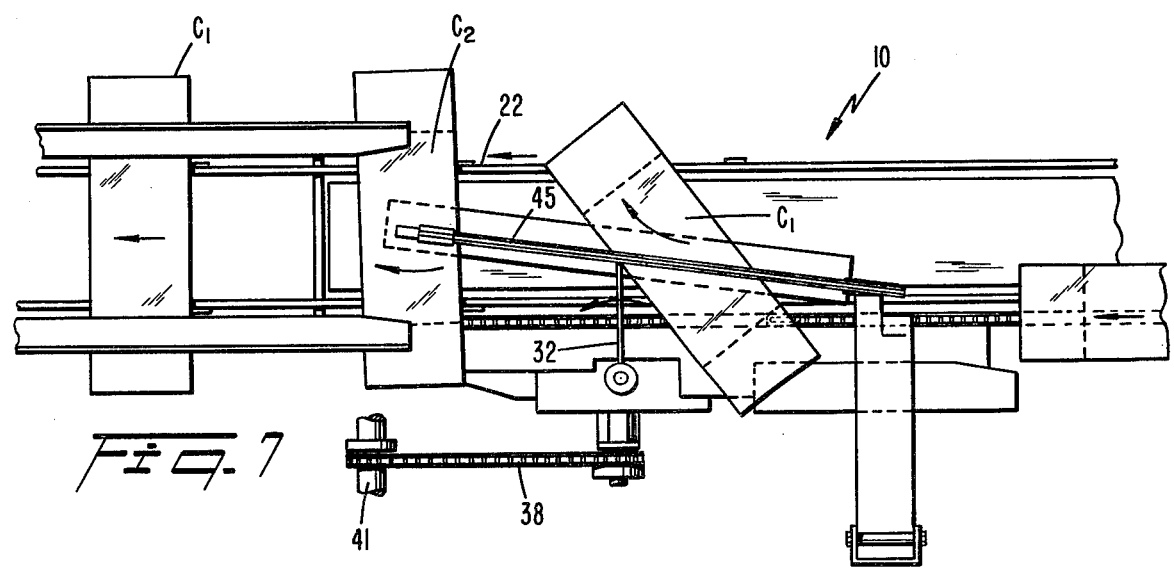

The sweeping of the finger 32 continues through the sequence of FIGS. 5-7 where the maximum turning of the box occurs. At the point in FIG. 8 of the drawings, the carton $C_1$ completes the sweeping action, the completion of the turn is assured and the sweep finger 32 continues its movement in front of the carton. The finger comes around in a circle in readiness for engaging and turning the next in-line carton, as shown by the position in FIG. 3.

Figure 8:
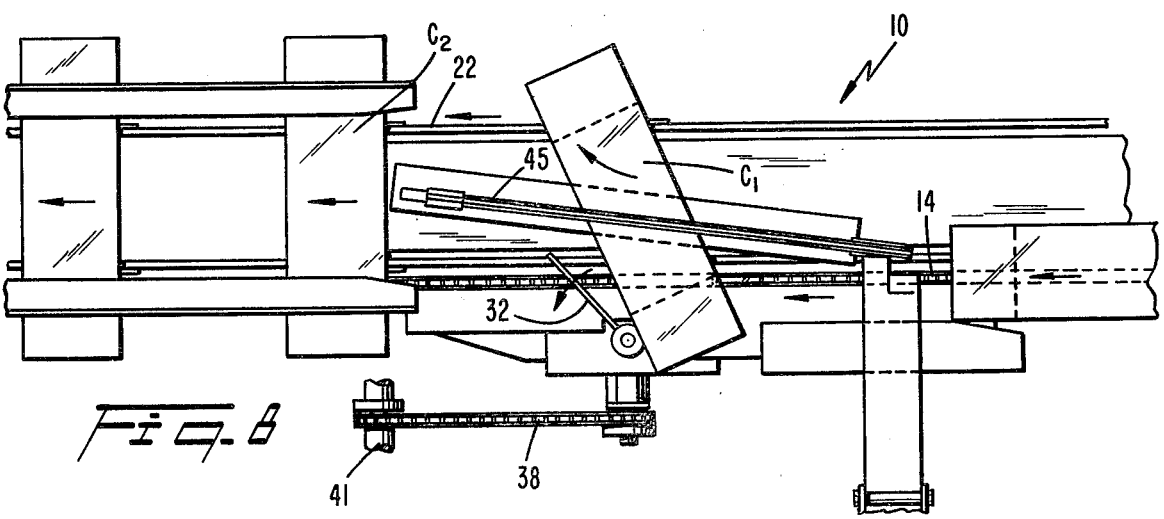

The carton $C_2$ in FIG. 3 is the carton positioned just downstream of the position of the carton $C_1$ in FIG. 8. At this point, the lug 25 on the far side of the carton $C_2$ is fully engaged with the new trailing side of the carton and the near side lug 27 is being rotated into full pushing position (see FIG. 2). The carton is also at this point being turned by the continued engagement of the friction plate 44. During the next increments of movement of the lug 27 through FIGS. 5-8, the carton $C_2$ reaches its full turned or reoriented position.

As best shown in the sequence FIGS. 3-8, the finger 32 advantageously engages the front side 51 of the carton adjacent the leading edge of the carton. This provides the most desirable turning leverage to the carton. Furthermore, once the distal end of the finger 32 has engaged the side, the point of engagement remains substantially static. This provides maximum control over the turning operation and avoids scraping or marring the surface of the carton side. The point of engagement is preferably within 15%-35% along the length of the carton.

The finger 32 is preferably fabricated of a flexible rod in order to provide flexure as the rod engages the cartons. This prevents deleterious jolts to the carton, as can be experienced with prior art devices.

In view of the foregoing, the excellent results of utilizing the principles of turning a carton with positive assist can be realized. The turning is initiated positively by engagement of distal end of the finger 32. The carton is assisted during substantially the full turn. This carton assist is especially useful for turning cartons having an elongated shape, as the cartons illustrated in the figures, and for turning cartons that are unusually heavy, or with contents susceptible to shifting. The device is simple in construction and utilizes driving means directly engaged with the closing machine drive. The positive control given by the sweeping action of the finger eliminates any erratic turning action that might otherwise occur with the cartons.

While the carton turning apparatus of the present invention has been described in considerable detail in the best mode for carrying out the invention, it is understood that various changes and modifications may occur to persons of ordinary skill in the art without departing from the spirit and scope of the appended claims. For example, in the broadest aspects of the invention the sweeping finger may comprise a finger mounted on an overhead chain extending at an obtuse angle to the feed path. The angle of the chain and the speed of drive of the chain is such as to position the lug against the side of the carton, and provide the same sweeping, turning action as described above.

I claim:

1. A method of turning a carton with positive assist, the carton having a top, bottom, leading edge and sides, comprising the steps of,
   conveying the carton along a predetermined path and having a first axis extending along the longitudinal axis of the path, turning the carton to provide reorientation with a second axis of the carton in alignment with the axis of the path, and
   independently engaging the carton along at least one side at a portion of said one side which is adjacent the leading edge with a rotating finger having a sweeping action with a substantially fixed sweep radius and a transverse sweeping component across said path to push the carton so that said leading edge is shifted transversely during forward movement, thereby assisting the turn.

2. The method of claim 1 wherein the step of turning provides reorientation of said carton through approximately 90°.

3. The method of claim 1 wherein said finger sweeps across said path in the direction of carton travel so as to assist the turn.

4. The method of claim 3 wherein said finger is rotated about an axis for bodily movement in a plane substantially parallel to said path, the distal end of the finger engaging said one side.

5. The method of claim 1 wherein the timing of said finger provides engagement along said portion of said one side within the first 15%-35% of its length, with the point of engagement remaining substantially constant during turning.

6. The method of claim 1 wherein is provided the additional step of timing the finger for the turning step to be initiated by engagement of said finger.

7. The method of claim 1 wherein said turning step includes retarding the movement of said carton opposite said one side, by frictionally engaging at least one of the top and bottom of said carton adjacent said opposite side.

8. The method of claim 1 wherein is provided the additional step of providing a first and second in-line conveyors having moving lugs, said conveying step being provided by engaging the trailing side of said carton with a single moving lug of said first conveyor, and after turning by engaging two spaced moving lugs of said second conveyor with the new trailing side.

9. The method of claim 8 including the step of delaying the engagement of the lug of the second conveyor adjacent said one side of said carton to complete the turning action.

10. An apparatus for turning a carton with positive assist, said carton having a top, bottom, leading edge and sides comprising
    conveyor means for moving said carton along a longitudinal path,
    means for turning said carton on said conveyor from a first orientation with a first axis aligned with said longitudinal path to a second orientation with a second axis so aligned,
    finger means mounted adjacent said path, and means for rotating said finger means about a substantially fixed axis to sweep across said path with a transverse component across said path, said rotating finger engaging the carton along at least one side at a portion of said one side adjacent said leading edge to push the carton so that said leading edge is shifted transversely during forward movement, thereby independently assisting in turning the carton.

11. The apparatus of claim 10 wherein said moving means provides sweeping movement to said finger means in the driection of carton travel.

12. The apparatus of claim 10 wherein said turning means and finger means provide sufficient turning action for reorientation of said carton through approximately 90°.

13. The apparatus of claim 11 wherein said finger means is an elongated rod, said moving means comprising a driven rotating hub extending substantially vertically and adjacent said path, said rod extending substantially radially from said hub, said hub of said moving means being driven in timed relationship to said conveyor.

14. The apparatus of claim 13 wherein said rod is flexible to permit shock absorbing action during turning.

15. The apparatus of claim 10 wherein said turning means comprises a plate frictionally engaging the bottom of said carton and pressure means frictionally engaging the top of said carton adjacent the side of said carton opposite said one side.

16. The apparatus of claim 15 wherein said pressure means includes a brush engaging the top adjacent the side of said carton opposite said one side.

* * * * *